Jan. 5, 1960 E. W. HAWKINSON 2,919,892
PNEUMATIC TIRE SPREADER AND METHOD
Filed Aug. 14, 1957 2 Sheets-Sheet 2
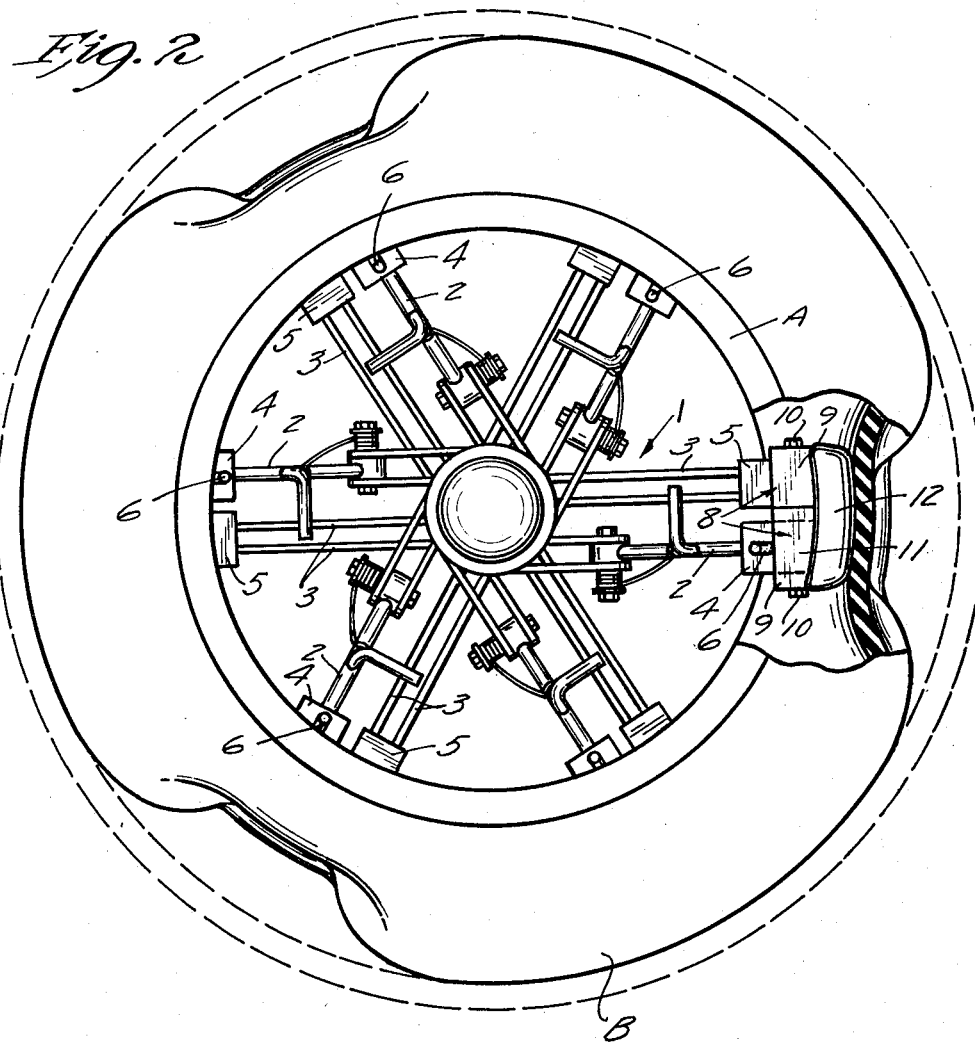
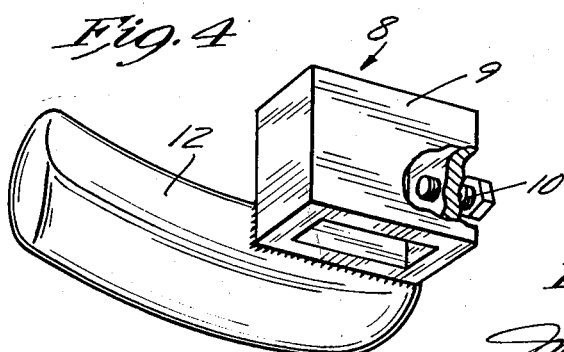
INVENTOR.
Earle W. Hawkinson
BY
Merchant & Merchant
ATTORNEYS

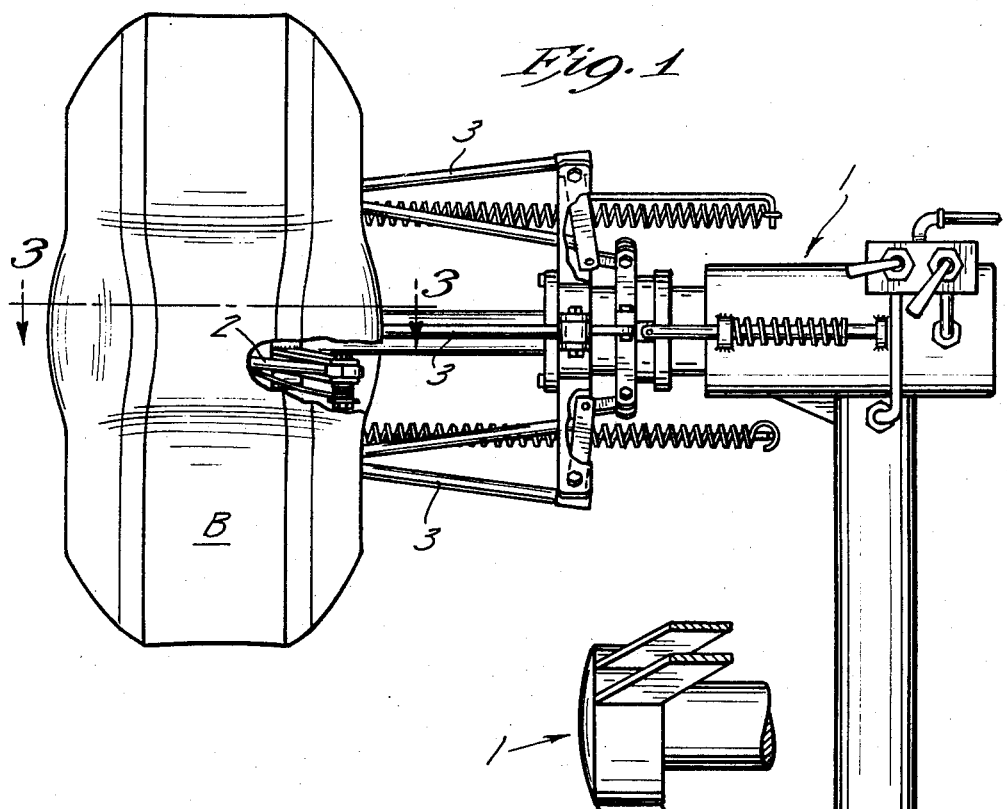
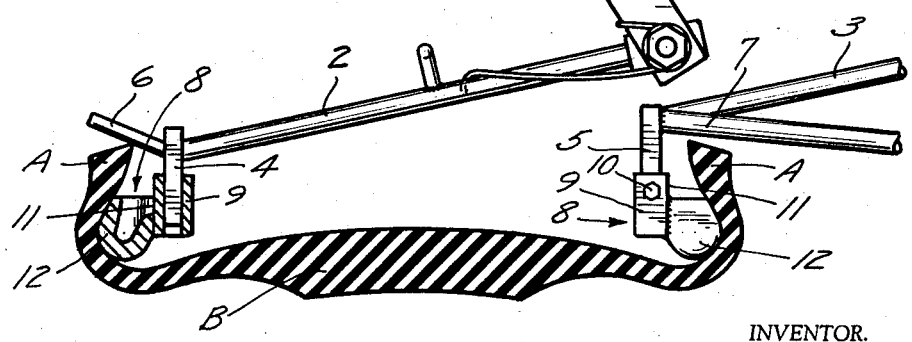

United States Patent Office 2,919,892
Patented Jan. 5, 1960

2,919,892

PNEUMATIC TIRE SPREADER AND METHOD

Earle W. Hawkinson, Minneapolis, Minn., assignor to Paul E. Hawkinson Company, Minneapolis, Minn., a corporation of Minnesota Application August 14, 1957, Serial No. 678,096

6 Claims. (Cl. 254—50.3)

My invention relates to spreading devices for pneumatic tire casings having relatively inelastic carcass constructions and to a method of temporarily reducing the tread circumference thereof and has for its principal object the provision of a device of this character which may effectively spread spaced side wall portions of such tire casings without directly engaging and damaging the bead portions thereof during such method.

A further object of my invention is the provision of a device of the class above described in which circumferentially spaced tire side wall engaging shoes are provided with means for adjustably positioning and thus effectively spacing same immediately radially outwardly with respect to the inelastic beads of a pneumatic tire casing and means for retaining said shoes in said spaced relationship during relative spreading movements thereof, whereby to exert maximum spreading force upon side wall portions of a pneumatic tire casing without directly engaging or damaging the more sensitive inelastic bead portions.

A still further object of my invention is the provision of a device of the class immediately above described wherein the shoes although circumferentially arcuate are of circumferential dimensions not greater than six inches nor less than three inches, whereby the inner side wall of the tire casings engaged and spread by said shoes may be laterally extended beyond the beads in flattening and buckling only the axially intermediate tread portions thereof while permitting the remainder of the tire casing, to wit: those portions circumferentially of the tire casing and intermediate said cooperating pairs of shoes, to be substantially undistorted.

A still further object of my invention is the provision of an attachment for power actuated tire spreaders of the type wherein the spreader arms are provided with radially outwardly projecting bead engaging lugs at their free ends, the lugs of each cooperating pair being circumferentially staggered with respect to each other sufficiently to permit all of said lugs to be disposed in a common plane transversely of said axis so as to permit all of said lugs to be placed between the beads of a pneumatic tire casing with a minimum of effort and without manual spreading of said beads, said attachment comprising socketed members adapted to be set over cooperating pairs of said lugs and to be detachably secured thereto, and each said member having an elongated tire inner side wall engaging shoe carried thereon so as to project axially outwardly from the plane of one face thereof, said shoe being circumferentially disposed with respect to said axis and extending laterally outwardly from said socket in only one direction whereby when two such attachments are placed on cooperating pairs of lugs of opposing pairs of said arms with the shoes facing in opposite directions, said shoes will be substantially axially aligned.

A still further object of my invention is the provision of a device of the class immediately above described in which said shoe extends substantially across the face of said socketed member and in which the overall circumferential dimension of said shoe is substantially twice the width of said face.

A still further object of my invention is the provision of a novel method of reducing the overall diameter of pneumatic tire casings the carcass construction of which is such that it will not contract uniformly throughout its circumference as the beads thereof are merely spread apart. An example of such tire carcass construction is the so-called wire tire now becoming popular. The carcass of such a tire is therefore resilient but not elastic and is made up of one or more plies of steel wires which extend back and forth from bead to bead in planes radiating from the axis of said tire. Because of the practical impossibility of reducing the tread circumference of tires of this character and hence the diameter thereof by the mere spreading of the beads thereof, it has been considered virtually impossible to retread same in unbroken cylinder-like molds of less diameter than the normal external tread diameter of the tires. In accordance with my novel process, the side walls of such tires are oppositely extended by engaging the inner side walls thereof immediately radially outwardly from the inelastic beads by cooperating pairs of substantially axially aligned pressure operated spreader shoes which are circumferentially arcuate and which have relatively short circumferential dimensions to wit: not less than three inches nor more than six inches. As this internal pressure on the side walls of the tire is continued to stretch the same outwardly beyond the relatively inelastic beads, circumferentially spaced tread portions of the tire casing axially intermediate the cooperating spread apart pairs of shoes are drawn inward toward relatively flattened condition and until inward buckling occurs. The remainder of the tire carcass, to wit: Those portions circumferentially intermediate said pairs of cooperating spreader shoes, are permitted to remain in substantially undistorted condition but are thus drawn radially inwardly and circumferentially toward each other, materially reducing the circumference and hence the diameter of the tire as long as such buckling pressure is maintained.

The above and still further objects of my invention will become apparent from the following detailed specification, appended claims and attached drawings.

Referring to the drawings wherein like characters indicate like parts throughout the several views:

Fig. 1 is a view in side elevation of a power tire spreader with a tire casing mounted thereon and constructed in accordance with my invention and illustrating the final step in the method of use thereof;

Fig. 2 is an enlarged view in front elevation illustrating my spreader as shown in Fig. 1 wherein alternate pairs i.e., three of the six pairs of cooperating spreader arms are equipped with shoes which are in operative spreading and buckling engagement with the inner walls of the tire casing mounted thereon. Said view like Fig. 1 showing all of the parts in the positions that they would assume in the final step of buckling the tire tread transversely between the extended side wall portions engaged by the pressure shoes. In this figure, some parts are broken away and some parts shown in section;

Fig. 3 is an enlarged fragmentary sectional view taken on the line 3—3 of Fig. 1; and showing the maximum spread apart position of one pair of cooperating inner side wall engaging shoes in extending the opposite side wall portions beyond the relatively inelastic beads to produce the desired inward buckling of the intermediate axially extending tread portion of the casing, and Fig. 4 is an enlarged perspective view of my novel tire spreader shoe carrying socketed member and showing the eccentric relationship of the shoe.

Referring with greater particularity to the drawings, the numeral 1 indicates in its entirety a conventional power actuated tire spreader of the type shown generally in United States Patents 1,908,311 and 2,634,095, and having cooperating pairs of spreader arms 2 and 3 spaced about a common axis. Arms 2 and 3 have at their outer ends radially outwardly projecting tire bead engaging lugs 4 and 5 respectively, cooperating pairs of which are circumferentially staggered as shown particularly in Fig. 2 so that same lie in a common vertical plane to facilitate simultaneous insertion thereof into the rather limited restricted opening normally existing between the beads A of a pneumatic tire casing B, whereby to obviate the manual spreading of the beads during such a preliminary operation. It will be noted that the arms 2 are here provided with generally axially extended positioning fingers 6 which limit the radially outward movement of the lugs 4 within a tire casing with respect to the inelastic beads A of the tire B, whereas the counterpart of the arms 3 accomplishing this function, is identified by the numeral 7.

In order to utilize and thus convert a conventional power actuated tire spreader of the type above described to one capable of carrying out my novel method, I provide cooperating pairs of inner tire side wall engaging and spreading shoes eccentrically mounted on socketed members as adjustable attachments to said lugs 4 and 5. These shoes are identified in their entirety by the numeral 8, and including sockets 9 slidably receive the lugs 4 and 5. Preferably and as shown, the sockets 9 are provided with lock screws 10. By reference to Fig. 3, particularly, it will be noted that each of the pair of lugs 4 and 5, comprises an elongated substantially rectangular bar of metal which extends laterally to one side of its carrying and operating arms 2 and 3 respectively. Further that said lugs 4 and 5 are of substantial length and are maintained parallel during expanding movement of the arms 2 and 3 so as to extend several inches into the tire casing B beyond the tire beads A and adjustably support the inner laterally disposed side wall engaging shoes 12 in the positions shown in Fig. 3. In this position of the shoes 12 and maximum extended positions of the arms 2 and 3 the side walls of the tire casing are bulged outwardly beyond the beads A and until the intermediate tread portion of the casing snaps inwardly or buckles between the shoes as shown in each of Figs. 1, 2 and 3.

Rigidly secured to the face 11 of the sockets 9 and projecting axially of the cooperating pairs of arms 2, 3 are the tire side wall engaging shoes 12 which, preferably and as shown, are generally circular in cross section and are arcuate, circumferentially of said axis so as to extend generally parallel to the beads A of a tire casing B when in tire spreading operation, as shown in Fig. 3. It will be noted particularly with respect to Figs. 2 and 4 that the shoes 12 extend entirely across the faces 11 of the sockets 9 and project circumferentially therefrom only in one direction, a distance substantially equal to the width of said faces 11. With this arrangement, it will be noted that when two such attachments 8 are telescopically received on a pair of cooperating circumferentially staggered lugs 4, with the elongated eccentric shoes 12 in opposite directions, said shoes will be substantially axially aligned. This is extremely important in the carrying out of my novel method in contracting a tire casing B circumferentially by flattening and then inwardly buckling widely spaced transverse tread areas of the tire casing only intermediate the cooperating pairs of shoes 12, axially of the casing B. Furthermore, I have found in practice that the circumferential dimensions of the shoe 12 should not be less than three inches nor more than six inches in order to facilitate this flattening and then buckling of the casing B intermediate said pairs of cooperating shoes 12. As shown in Fig. 2, the tire casing B circumferentially intermediate the cooperating shoes 12 remains in a substantially undistorted condition but substantially reduced in circumference as shown by the dotted lines in Fig. 2.

My novel apparatus and method, above described, have been thoroughly tested and found to be completely satisfactory for the accomplishment of the above objects and while I have shown a preferred embodiment thereof, it is obvious that both the method and apparatus are capable of modification without departure from the scope and spirit of the appended claims.

What I claim is:

1. In a tire casing spreader, pairs of cooperating spreader and tread buckling and contracting machine, arms circumferentially spaced about a common axis, substantially axially aligned inner side wall engaging shoes carried on the free end portions of said arms, and bead engaging means also on said arms spacing said shoes immediately radially outwardly with respect to the beads of a tire casing and for maintaining said spaced relationship during spreading movements of said arms, said shoes extending generally circumferentially of said axis and having circumferential dimensions not substantially less than three inches nor substantially more than six inches.

2. An attachment for tire spreaders of the type which include, pairs of cooperating generally axially extended spreader arms circumferentially spaced about a common axis, and radially outwardly projecting bead-engaging lug means on the free ends of said arms, the lug means of each cooperating pair being circumferentially staggered with respect to each other sufficiently to permit all of said lug means to be disposed in a common plane transversely of said axis, said attachment comprising a socketed member adapted to be mounted on said lug means and to be detachably secured thereto, and an elongated tire side wall engaging shoe carried by said socketed member and projecting axially outwardly from the plane of one face thereof, said shoe being circumferentially disposed with respect to said axis and extending laterally outwardly from said socketed member in only one direction whereby when two such attachments are placed on said lug means of opposing pairs of said arms with the shoes facing in opposite directions said feet will be axially aligned.

3. The structure defined in claim 2 in which said shoe extends substantially entirely across the face of said socketed member, and in which the overall circumferential dimension of said shoe is substantially twice the width of said face.

4. In a tire casing spreading and tread buckling and contracting machine including a stand having pairs of cooperating spreader arms circumferentially spaced about a common axis, and tire bead engaging means at the outer ends of said arms, the improvement comprising elongated tire inner side wall engaging shoes mounted on one side of said arms adjacent said bead engaging means, and means to adjust said shoes radially with respect to said bead engaging means, whereby to exert opposing pressure on selected areas of the inner side walls of a tire casing radially outwardly of the bead.

5. The structure covered in claim 4, wherein parallel generally rectangular lugs extend radially outwardly from said arms adjacent said bead engaging means and socketed shoe carrying members adjustably mounted on said lugs.

6. The method of reducing the overall diameter of a pneumatic tire casing tread for the purpose of entering same into and removing same from a cylindrical retreading mold having an internal diameter less than the maximum external tread diameter of said casing, said method comprising the successive steps of engaging inner opposite side wall areas of said casing at widely spaced points circumferentially thereof and at radial points substantially spaced between the beads and tread portion, exerting oppositely directed pressure on said areas of said inner side walls to simultaneously move said side walls and bead portions in the same directions, and continuing said oppositely directed pressure on said inner side wall areas to extend said areas to a greater extent than said beads and the intermediate side wall portions, whereby to cause inward buckling of tread portions between said extended side wall areas.

References Cited in the file of this patent

UNITED STATES PATENTS

| | | |
|---|---|---|
| 2,353,570 | Kraft | July 11, 1944 |
| 2,665,883 | Glynn | Jan. 12, 1954 |

UNITED STATES PATENT OFFICE
CERTIFICATE OF CORRECTION

Patent No. 2,919,892            January 5, 1960

Earle W. Hawkinson

It is hereby certified that error appears in the printed specification of the above numbered patent requiring correction and that the said Letters Patent should read as corrected below.

Column 4, lines 11 to 13, for "In a tire casing spreader, pairs of cooperating spreader and tread buckling and contracting machine, arms circumferentially spaced about a common axis," read -- In a tire casing spreader and tread buckling and contracting machine, pairs of cooperating spreader arms circumferentially spaced about a common axis, --.

Signed and sealed this 1st day of November 1960.

(SEAL)
Attest:

KARL H. AXLINE
Attesting Officer

ROBERT C. WATSON
Commissioner of Patents